United States Patent [19]

Shuey et al.

[11] 3,811,073

[45] May 14, 1974

[54] ALTERNATING CURRENT SENSING CIRCUIT AND METHOD

[75] Inventors: Kenneth C. Shuey, Cridersville; Donal E. Baker, Lima, both of Ohio

[73] Assignee: Westinghouse Electric Corporation, Pittsburgh, Pa.

[22] Filed: Mar. 5, 1973

[21] Appl. No.: 337,969

[52] U.S. Cl............... 317/31, 317/33 SC, 323/24
[51] Int. Cl. ............................................. H02h 3/08
[58] Field of Search ... 317/31, 36 TD, 33 SC, 27 K; 323/24; 307/202

[56] References Cited
UNITED STATES PATENTS 3,602,773  8/1971  Berstein ..................... 317/33 SC
3,408,558  10/1968  Peterson ..................... 317/33 SC Primary Examiner—J. D. Miller
Assistant Examiner—Patrick R. Salce
Attorney, Agent, or Firm—G. H. Telfer

[57] ABSTRACT

A full wave rectified voltage that is proportional to alternating current in a load circuit is developed by using inverse parallel switching devices having a rectifying characteristic, such as thyristors, to develop half wave rectified signals processed by an operational amplifier to produce the desired signal that is useful for purposes such as the input to an inverse time delay circuit.

6 Claims, 6 Drawing Figures

PATENTED MAY 14 1974　　3,811,073

ALTERNATING CURRENT SENSING CIRCUIT AND METHOD

BACKGROUND OF THE INVENTION

This invention relates to alternating current circuitry and particularly to circuitry for sensing the magnitude of alternating current in a form useful for various control functions.

There is increasing interest in the use of solid state switches in place of electromechanical relays. The principal functions of the solid state switches are the switching and protection of loads and associated load wiring. One major field of application for such devices is in aircraft electrical systems where there are severe demands for reducing size, weight, and cost while maintaining a high quality of performance and reliability. Magnetic devices, such as transformers and chokes, have adverse size, weight and cost characteristics that dictate they should be avoided where possible.

AC solid state power controllers are one area of interest. These are generally characterized by the utilization of some solid state switching means to control the application of AC power to a load. Various control functions are needed in such power controllers to monitor their operation. For example, it is desirable to sense the alternating current to develop a signal useful for protective functions, such as to be able to cause an interruption upon the occurrence of a predetermined excessive current.

Because transformers are undesirable, the normal technique of using a current transformers for sensing AC load current is undesirable. Therefore, alternative means that do not depend on the use of current transformers have been developed. One such means is that in which a small resistive shunt is provided in series with the load to produce a small AC voltage as a function of current. Then, with a relatively complex circuit, the signal is full wave rectified and amplified for use. It is desirable to reduce the complexity of the means for sensing the AC current and developing a usable signal from it.

In AC power controllers of current interest, it is normally the case that the switching means for controlling the application of power to the load comprises a pair of inverse parallel semiconductor switching devices that are so controlled such that the two devices, when on, conduct upon alternate half cycles of the alternating current. The semiconductor devices of greatest interest are thyristors or controlled rectifiers that have an inherent rectifying characteristic.

SUMMARY OF THE INVENTION

Briefly, in accordance with this invention, a full wave rectified voltage that is proportional to alternating current in a load circuit is developed by using inverse parallel switching devices having a rectifying characteristic, such as thyristors, to develop two half wave rectified signals processed by an operational amplifier connected as a differential amplifier to produce the desired output that is useful for purposes such as the input to an inverse time delay circuit.

The circuit of this invention utilizes the switching devices normally required for load switching to provide the rectification that results in obtaining the DC output voltage usable for the overcurrent trip circuit. In the known prior art, separate rectification apparatus was required. The present technique therefore is simple to implement in order to provide the necessary signal and results in a considerable reduction in the number of components and cost savings over previously known techniques.

In contrast with the known prior art scheme of having a resistive shunt in series with the combination of inverse parallel thyristors, the present invention uses two resistive elements in the load circuit. The two resistive elements are individually in series with one of the thyristors, and on the same side thereof with respect to the supply. Half wave rectified voltages developed across the two resistive elements are applied through additional resistors to the respective inputs of a single operational amplifier operating in a differential amplifier configuration. Since the half wave rectified signals are of opposite polarities, the inversion of one input by the opamp and the combination at the two inputs, results in a full wave rectified DC voltage proportional to the AC through the load. The reasons that the prior circuit with a single resistive shunt was so complex, by comparison to the present circuit, are full wave rectification and amplification of a current signal without transformers require at least two operational amplifiers and additional logic components to provide inversion of the inverted portion of the AC waveform and addition of the time component halves to form the desired output.

THE DRAWING

PREFERRED EMBODIMENTS

Figure 1:
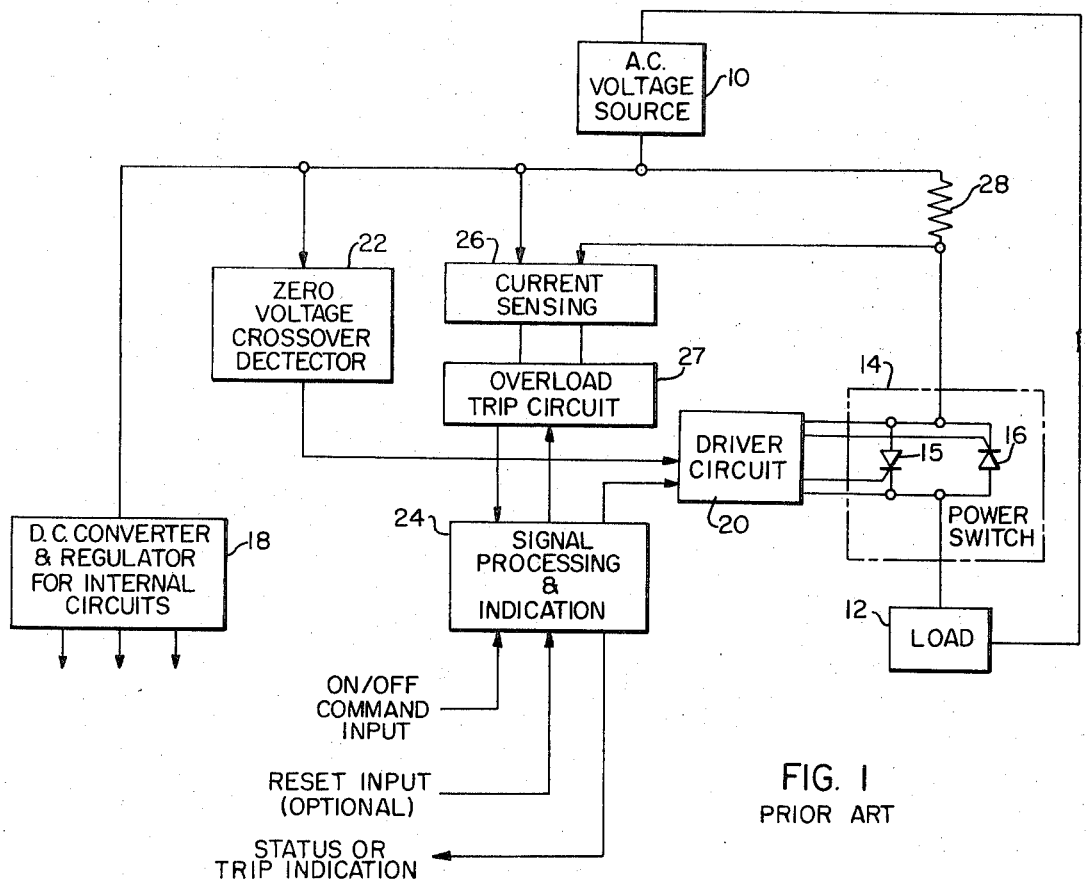
FIG. 1 is a circuit schematic in block diagram form illustrating an example of a power controller in accordance with the prior art which may be modified and improved by the present invention.

FIG. 1 generally illustrates a system wherein alternating voltage from a source 10 to a load 12 is controlled by a power switch 14 that includes a pair of inverse parallel thyristors 15 and 16.

The alternating voltage from the source 10 is also used to power the internal circuits. For that reason, there is shown a block 18 labeled "DC Converter And Regulator For Internal Circuits" connected to the alternating voltage source 10 and which has outputs for connection to various other of the internal circuits. The power switch 14 is directly controlled by a circuit portion 20 indicated as a "Driver Circuit" connected to the gate element of each of the thyristors. The driver circuit has an input from a block 22 labeled "Zero Voltage Crossover Detector" which is a known means for permitting the operative effect of signals for initial turn-on to the driver circuit 20 only upon the occurrence of a crossover of the AC voltage waveform. Such a signal is developed by the "Signal Processing and Indication" block 24. Other elements illustrated include a block 26 for "Current Sensing" and an "Overload Trip Circuit" block 27. Block 26 develops a voltage from a series shunt 28 in the load circuit. Block 27 takes the sensed signal and produces an informative output to block 24 upon occurrence of a predetermined overload condition ultimately influencing driver circuit 20 and switch 14. This general type of system is known and its nature and manner of operation may be further understood by referring to a paper entitled "Power Controllers For Automatically Controlled Electrical Systems"by D. E. Baker appearing in *NAECON Proceedings*, May, 1971.

The system illustrated in FIG. 1 is merely one example of an application of an AC sensing circuit. The improved sensing circuit of the present invention may be advantageously used instead of that shown which comprises block 26 and resistive shunt 28. The details of an example of circuit portion 26 that cooperates with the single resistive shunt 28 may be understood better by reference to Fairchild Semiconductor Linear Integrated Circuits Applications Handbook, page 150, FIG. 7 which describes a full wave rectifier that can be used with a single resistive shunt for AC current sensing.

The following patents and applications may be referred to for examples of suitable driver circuits and trip circuits: Ser. No. 168,906, Aug. 4, 1971 by K. C. Shuey; Ser. No. 221,276, Jan. 1, 1972 by the present inventors, both assigned to the present assignee; and U.S. Pat. No. 3,697,813, Oct. 10, 1972 by D. A. Fox.

Figure 2:
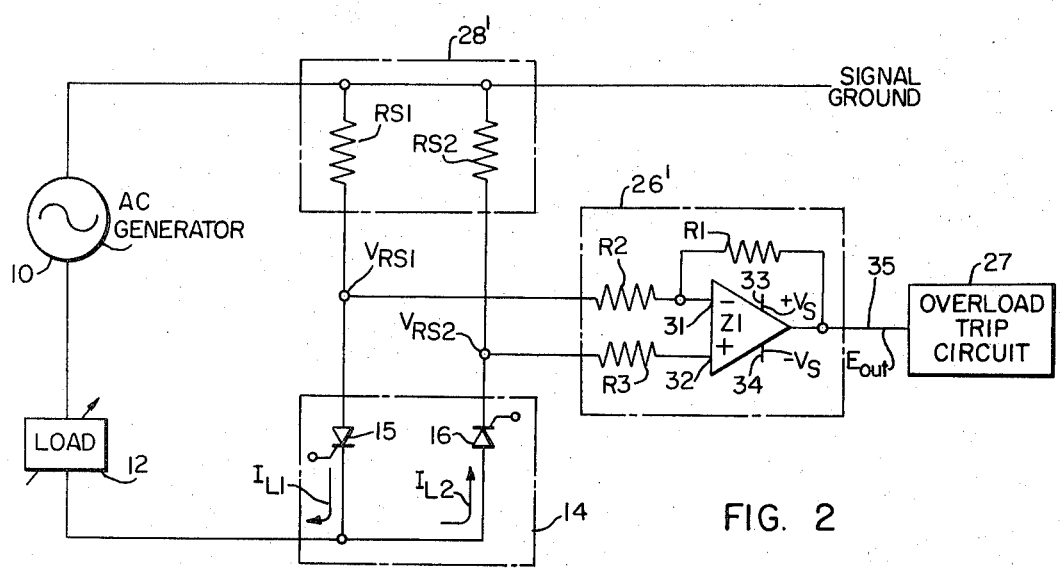
FIG. 2 is a circuit schematic of one embodiment of an AC sensing circuit in accordance with the present invention.

Referring to FIG. 2, there is shown a circuit including an AC generator or other alternating voltage source 10 in series with a load 12 with switching means 14 comprising inverse parallel thyristors 15 and 16 for controlling the application of power to the load in a closed circuit loop. Several elements included in FIG. 1 are omitted from FIG. 2 merely for convenience of illustration.

In accordance with this invention, each thyristor 15 and 16 has in series with it, at one pair of oppositely poled terminals, a resistive element $R_{S1}$ and $R_{S2}$ whose magnitude may be quite small as will be subsequently developed. Opposite terminals of the thyristors are connected in common to one side of the load circuit. The resistive shunts $R_{S1}$ and $R_{S2}$ each have one end connected in common to the source 10 and the other ends, intermediate the resistors and the thyristors, are connected, respectively, through individual resistive impedances $R_2$ and $R_3$ to the inputs 31 and 32 of an operational amplifier Z1 (sometimes referred to herein as an "opamp").

For correspondence with FIG. 1, the combination of resistive shunts $R_{S1}$ and $R_{S2}$ is included in a dashed line block identifed as 28' and the operational amplifier and its operating circuit is in a dashed line block identified as 26'. The combination of the blocks 26' and 28' may sometimes be referred to collectively as AC sensing circuitry or by a similar expression.

Operational amplifier Z1 is connected in the manner of a differential amplifier in accordance with known operational amplifier practice. (See, for example, an article by Schick, *IEEE Spectrum*, April 1971, pages 36–38, for discussion of differential amplifiers using one opamp). For this purpose, in the embodiment of FIG. 2, there are provided opposite polarity bias voltages (+$V_S$ and −$V_S$, respectively with respect to signal ground) to the bias terminals 33 and 34 of the operational amplifier and an additional resistive impedance $R_1$ is connected between one of the inputs 31 (the negative or inverting input terinal) and the output terminal 35 of the operational amplifier.

Figure 3:
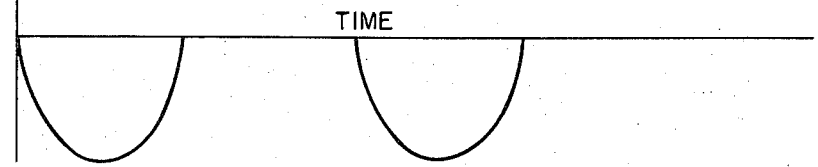
FIG. 3, 4 and 5 are waveforms illustrative of the operation of the circuit of FIG. 2.
Figure 5:
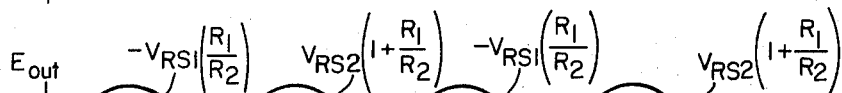
Figure 5:
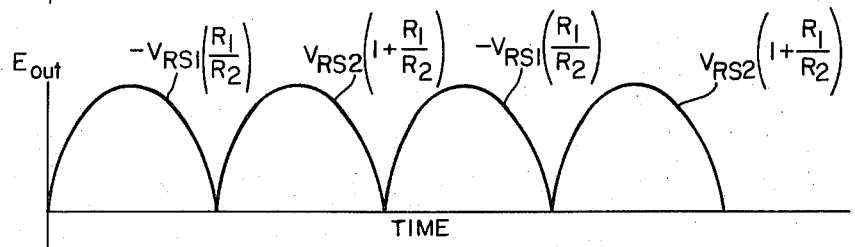

The following is a description of the manner of operation of the circuit of FIG. 2:

When voltage ($V_{RS1}$ with respect to signal ground) is present across $R_{S1}$ (i.e., current is flowing in the load circuit in the direction shown for $I_{L1}$, the output voltage ($E_{out}$ with respect to signal ground) at terminal 35 is 1. $E_{out} = -(R_1/R_2) V_{RS1}$, where $V_{RS1} = -(I_{L1})(R_{S1})$ (see FIGS. 3 and 5).

At that time, the voltage ($V_{RS2}$) across $R_{S2}$ iw zero because there is no load current $I_{L2}$, in the forward direction of thyristor 16.

When the alternating current from source 10 reverses, there is voltage ($V_{RS2}$) across $R_{S2}$ and none across $R_{S1}$, thus 2. $E_{out} = V_{RS2} [1 + (R_1/R_2)]$, where $V_{RS2} = (I_{L2})(R_{S2})$ Combining equations (1) and (2) the instantaneous value of $E_{out}$ over a full AC cycle is $E_{out} = V_{RS1}R_1/R_2 + V_{RS2} [1 + (R_1/R_2)]$ If the relative values of $R_{S1}$ and $R_{S2}$ (and hence the relative magnitudes of $V_{RS1}$ and $V_{RS2}$) are properly selected, then the output voltage $E_{out}$ will be a balanced ("balanced" meaning equal amplitude for each half cycle) full wave rectified voltage proportional to the balanced input AC current. The proper relative values are determined by the ratio of the gain terms in equations (1) and (2) and can be sbown to be:

$R_{S2} = R_{S1} (R_1)/R_1 + R_2$

Figure 4:
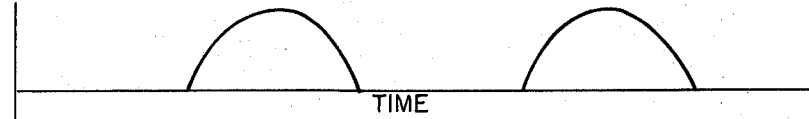

As an example, where a ratio of $R_1/R_2 = 10$, there is a nominal gain from the opamp of 10, and $R_{S2}$ should be equal to ten-elevenths of $R_{S1}$. See FIGS. 4 and 5. The value of $R_3$ is selected to be equal to the parallel combination of $R_1$ and $R_2$ for normal opamp design considerations.

The following listing presents, by way of further example, additional details of a circuit that has been made and successfully operated:

| | |
|---|---|
| Alternating Voltage Source 10 | 115V., 400 Hz., nominal, with transient variations over a voltage range of from 60 v. to 180 v. |
| Load 12 | Operated with various loads from no load to short circuit. |
| Thyristors 15 and 16 | Westinghouse type 250. |
| $R_{S1}$ | 0.1 ohm. |
| $R_{S2}$ | 0.091 ohm. |
| $R_1$ | 10 K ohms. |
| $R_2$ | 1 K ohms. |
| $R_3$ | .91 K ohms. |
| Bias voltages +$V_S$ and −$V_S$ | ±10 volts |

The circuit was operated with an inverse time delay overload trip circuit 27 of a previously known type which ultimately controlled thyristor driver circuits (abovementioned copending application Ser. No. 221,276) connected to gate electrodes to keep thyristors 15 and 16 from turning on upon occurrence of a predetermined overload.

The circuit of FIG. 2 requires positive and negative direct bias voltages, ± $V_S$, for the opamp, which have to have separate supplies, such as a full wave rectifier for each, to be developed from the AC line voltage. Despite this requirement, there are improvements of about 50 percent in volume and weight and about 100 percent in cost over the previously used sensing circuit.

Figure 6:
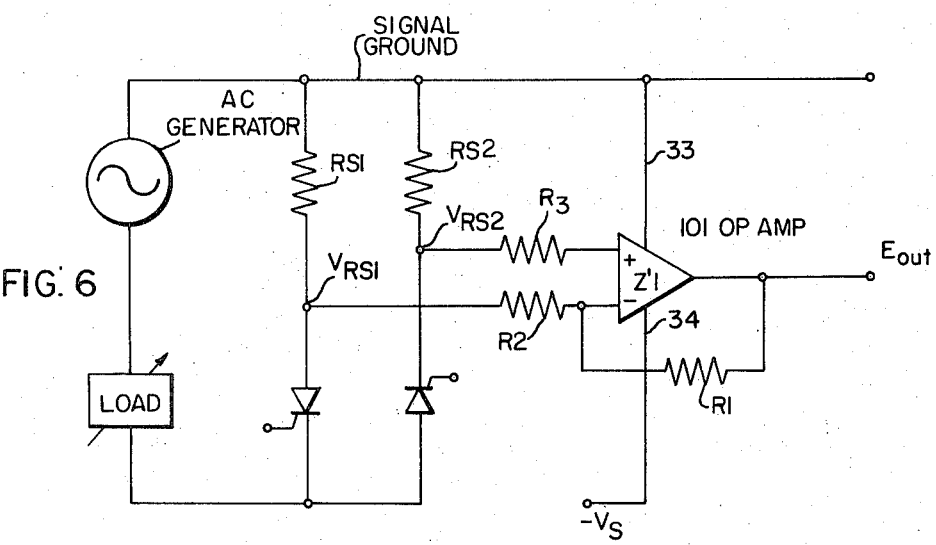
FIG. 6 is a circuit schematic of an alternative embodiment of an AC sensing circuit in accordance with this invention.

FIG. 6 illustrates an alternate embodiment of the invention which can provide further improvement by avoiding the need for opposite polarity bias voltages on the opamp. FIG. 6 provides this feature because the operational amplifier Z1' is selected to be of a type, such as type 101, which has a unique feature that allows linear operation when one bias terminal 33 is connected or referenced to the signal ground line of the system and it is only necessary to provide a single supply which may be applied to the negative bias terminal 34 of the amplifier. Circuit operation is, however, similar to that described for the circuit of FIG. 2 and will not be further detailed herein.

It is therefore seen that the disclosed circuit provides a simple means for sensing AC current and producing a full wave rectified output indicative of the AC current in the system. A significant reduction in the number of parts and costs over prior techniques is attained. An incidental benefit is also achieved in that it is found that the resistors of the circuits in accordance with this inventikocan be fabricated by thick film technology within necessary limits without requiring active resistor adjustments, that is, the adjustment of resistive values after initial fabrication and during a period in which the circuit is operated.

We claim:

1. Electronic apparatus, for producing a rectified voltage proportional to an alternating current, comprising: an alternating voltage source, a load, and switching means for selectively permitting current flow in a closed circuit loop; said switching means comprising first and second solid state switching devices that have a rectifying characteristic and which are connected in an inverse parallel combination with a first pair of oppositely poled terminals connected in said loop, first and second resistive elements having first terminals respectively connected in series with said first and second switching devices at a second pair of oppositely poled terminals, said first and second resistive elements having a common connection in said loop; an operational amplifier having a pair of input terminals connected respectively through third and fourth resistive elements to said first terminals of said first and second resistive elements; and a fifth resistive element connected from one of said input terminals to an output terminal, said operational amplifier and said resistive elements as so connected being operative to produce a full wave rectified voltage waveform representing the alternating current of said loop.

2. The subject matter of claim 1 wherein: said solid state switching devices are thyristors.

3. The subject matter of claim 2 wherein: the output of said operational amplifier is supplied to an inverse time delay trip circuit operatively associated with said thyristors to interrupt current flow in said loop upon occurrence of a predetermined overload current flow.

4. In combination: a pair of semiconductor switching devices having an inverse parallel relation therebetween for power control between an alternating voltage source and a load, said switching devices having a rectifying characteristic; resistive means for producing individual half wave rectified voltage signals representing the positive and negative polarity half-cycles of the AC waveform in the load circuit as rectified by said switching devices, said resistive means comprising resistive elements respectively in series with said switching devices within said inverse parallel combination; means for inverting one of said half wave rectified signals for making both said half wave rectified signals of the same polarity and for combining said two half wave rectified signals to produce a full wave rectified signal.

5. The subject matter of claim 4 wherein: said means for inverting and combining comprises a single operational amplifier.

6. The subject matter of claim 5 wherein: said operational amplifier has a pair of input terminals resistively connected to points between said thyristors and their respective series resistive elements, the signal applied to a first of said input terminals being inverted in polarity by said operational amplifier; and an additional resistor is connected between the output of said operational amplifier and said first input terminal.

* * * * *